United States Patent [19]

Matake

[11] Patent Number: 5,209,579
[45] Date of Patent: May 11, 1993

[54] THRUST BEARING DEVICE
[75] Inventor: Kozo Matake, Kanagawa, Japan
[73] Assignee: Ebara Corporation, Tokyo, Japan
[21] Appl. No.: 375,345
[22] Filed: Jul. 5, 1989
[30] Foreign Application Priority Data Jul. 19, 1988 [JP] Japan .................. 63-95536[U]

[51] Int. Cl.⁵ .................. F16C 17/06; F16C 32/06
[52] U.S. Cl. ...................... 384/308; 384/105
[58] Field of Search ............... 384/99, 105, 122, 124, 384/223, 306, 307, 308, 312, 909, 912, 908

[56] References Cited

U.S. PATENT DOCUMENTS

| | | | |
|---|---|---|---|
| 1,409,552 | 3/1922 | Kingsbury et al. | 384/224 |
| 2,424,028 | 7/1947 | Haeberlein | 384/223 |
| 3,565,498 | 10/1969 | Leopard et al. | 384/306 X |
| 4,443,043 | 4/1984 | Yamagachi | 384/113 |
| 4,668,106 | 5/1987 | Gu | 384/105 |
| 4,730,998 | 3/1968 | Kakuda et al. | 384/312 X |
| 4,743,125 | 5/1988 | Dammel et al. | 384/99 |
| 4,798,771 | 1/1989 | Vogel | 384/912 X |
| 4,886,378 | 12/1989 | Matake | 384/124 X |

FOREIGN PATENT DOCUMENTS

| | | |
|---|---|---|
| 420499 | 10/1925 | Fed. Rep. of Germany . |
| 868087 | 1/1953 | Fed. Rep. of Germany . |
| 1803413 | 5/1969 | Fed. Rep. of Germany . |
| 1010959 | 4/1952 | France . |
| 53-56448 | 5/1978 | Japan . |
| 59-164414 | 9/1984 | Japan . |
| 82488 | 11/1918 | Switzerland . |
| 1239386 | 7/1971 | United Kingdom . |
| 1392245 | 4/1975 | United Kingdom . |

Primary Examiner—John M. Jillions
Assistant Examiner—William G. Battista, Jr.
Attorney, Agent, or Firm—Wenderoth, Lind & Ponack

[57] ABSTRACT

A thrust bearing device for an electric motor lubricated by liquid within a motor casing includes a rotary disk fixed on a primary shaft of the motor and a sliding shoe member having sliding surfaces slidably in contact with a sliding surface of the rotary disk. The sliding shoe member is made of metal and is provided with a plurality of segmented shoes unitarily connected to a common base through respective ribs. The sliding shoe member is fixed to a motor bracket with a gap having a predetermined configuration provided between the retaining surface of the motor bracket and the bottom surface of the common base of the sliding shoe member at each of the portions thereof which respectively correspond to the shoes.

8 Claims, 6 Drawing Sheets

THRUST BEARING DEVICE

BACKGROUND OF THE INVENTION

1. Field of the Invention

The present invention relates to a thrust bearing device, and more particularly to such a device that is used in an electric motor, for example, a submersible motor, wherein liquid is contained within the casing thereof to lubricate the thrust bearing device.

2. Prior Art

Heretofore, a thrust bearing device of the type referred to above has involved the use of plural tilting pads, each pad being designed to have a particular configuration such as projecting or inflating in the central region thereof. These pads serve to constitute one of the opposing sliding surfaces. Use of these pads has in turn involved the employment of several related means and many parts which demand additional expense for the installation and maintenance thereof, such maintenance being difficult to carry out.

Figure 1A:
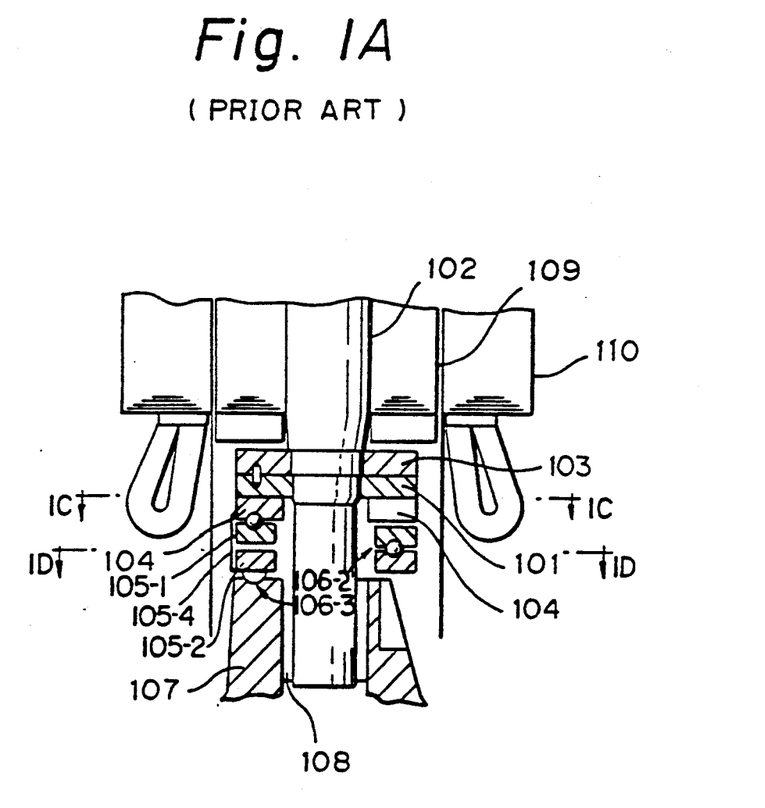
FIGS. 1A—1D illustrate the structure of a conventional thrust bearing device.
Figure 1B:
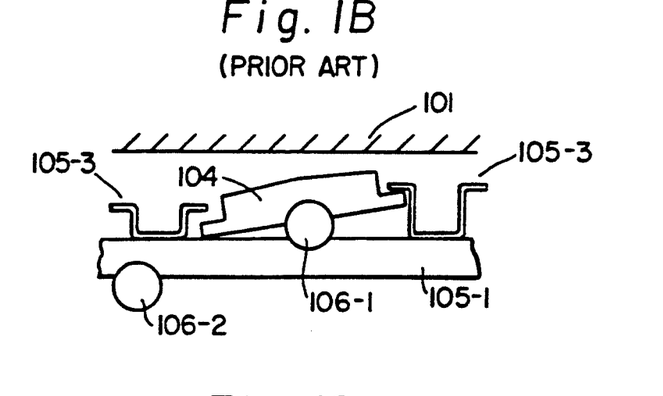
Figure 1C:
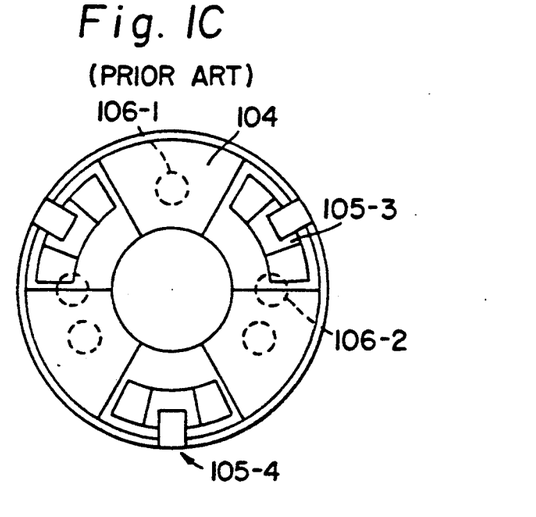
Figure 1D:
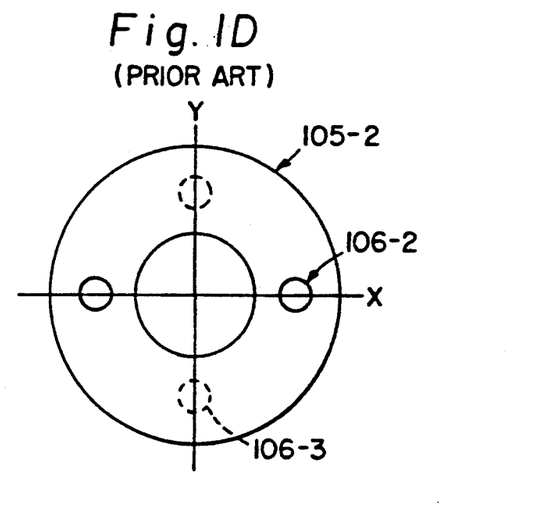

For example, FIG. 1A illustrates the structure of a typical conventional thrust bearing device in section, FIG. 1B is a fragmentary side view of FIG. 1A, FIG. 1C is a view taken along line 1C—1C of FIG. 1A with the shaft being eliminated for clarification, and FIG. 1D is a view taken along line 1B—1B of FIG. 1A with the shaft being eliminated for clarification.

In this conventional thrust bearing device, the rotary side of the bearing device comprises a rotary disk 101 and a thrust disk 103 adapted to hold in place the rotary disk 101 and attached to a primary shaft 102, while the stationary side of the device comprises a plurality of tilting pads 104 adapted to slidably contact the sliding surface of the rotary disk 101, components for retaining the tilting pads 104, and a complicated alignment mechanism constituted by several components adapted to keep the respective sliding surfaces of the tilting pads 104 coplanar. This stationary side of the bearing device is simply placed on a bracket 107 of the motor.

More specifically, the tilting pads 104 are circumferentially spaced from each other and are placed on a first alignment disk 105-1 through first alignment balls 106-1. An alignment ball 106-1 allows the tilting pad 104 to tilt relative to the disk 105-1 to form a wedge shaped lubricating film between the pad 104 and the sliding surface of the rotary disk 101. Excessive movement of the pads 104 is restrained by pad retainers 105-3 which are disposed so as to engage both sides of each pad. Each pad retainer 105-3 is held in position against the first alignment disk 105-1 by a bearing holder 105-4 which will be explained hereunder. The first alignment disk 105-1 is, in turn, placed on a second alignment disk 105-2 through second alignment balls 106-2 and the second alignment disk 105-2 is in turn, placed on the upper surface of the bracket 107 through third alignment balls 106-3. The second alignment balls 106-2 are disposed along axis-X, whereas the third alignment balls 106-3 are disposed along axis-Y on the X-Y surface of the bearing assembly, as shown in FIG. 1D. The alignment mechanism constituted by these elements 105-1, 105-2, 106-1 to 106-3 allows the tilting of the first alignment disk 105-1, and therefore tilting pads 104, within the X-Y surface of the bearing to compensate for unevenness in height between the sliding surfaces of the tilting pads 104 caused by manufacturing tolerances of the bearing components and thereby keeps the respective sliding surfaces of the tilting pads 104 coplanar. The bearing holders 105-4 extends between the pad retainers 105-3 and the second alignment disk 105-2 and thereby hold all the bearing components in a single assembly.

Each of the sliding surfaces of the tilting pads 104 has a particular shape which is configured as a so-called centrally projected or inflated shape, the center portion being higher than the opposite ends, so that a wedge shaped lubricating film is properly formed between the centrally projected surfaces of the tilting pads 104 and the surface of the rotary disk 101 during the relative rotation therebetween. In this drawing, the reference numeral 108 denotes a radial bearing, 109 a rotor, and 110 a stator.

In the conventional thrust bearing device explained above, however, the following drawbacks may be observed.

(1) The production cost is high since the alignment mechanism constituted by the many components is complicated.

(2) A retaining means constituted by the complicated components is required in order to allow the necessary movement for tilting pads 104.

(3) Fabrication and maintenance are not easy because of the special configuration of the sliding surfaces of the tilting pads 104.

(4) Installation of the thrust bearing device is limited to a particular procedure since the alignment mechanism constituted by the complicated components is not fixed to the motor bracket 107.

(5) The is difficulty in using common components on the rotary and stationary sides.

(6) Maintenance is not easy because of the high precision required of the components constituting the alignment mechanism.

SUMMARY OF THE INVENTION

In view of the above-described problems of the prior art, it is an object of the present invention to provide a thrust bearing device for an electric motor which is designed so that components, particularly those on the stationary side, are unified so as to achieve a marked reduction in the production cost without adversely affecting the performance heretofore achieved in the prior art.

In order to solve the problems stated above, the present invention provides a thrust bearing device for an electric motor lubricated by liquid within a motor casing which comprises a rotary disk directly or indirectly fixed on a primary shaft of the motor and a sliding shoe member having sliding surfaces slidably in contact with a sliding surface of the rotary disk. The sliding shoe member is made of metal and is provided with a plurality of segmented shoes unitarily connected to a common base through respective ribs. The sliding shoe member is fixed to a motor bracket with a gap having a predetermined configuration provided between the retaining surface of the motor bracket and the bottom surface of the common base of the sliding shoe member at each of the portions thereof which respectively correspond to the shoes.

By virtue of the above-described arrangement, when a load is applied to the thrust bearing device, the shoes are deformed elastically and a liquid film having a wedge shape is formed between the rotary disk and the shoes. Hence, a high load bearing capacity can be expected of this device, as in the case of a conventional thrust bearing device employing a tilting pad system. At the same time, the gap that is present between the common base of the sliding shoe member and the motor bracket absorbs the deflection caused by the inevitable manufacturing tolerances on the sliding surface of the disk and the top surface of the bracket, thereby preventing local contact of the sliding surfaces of the shoes of the sliding shoe member, and thus enabling the sliding mode of the shoes to be kept uniform.

Further, according to this invention, no complicated alignment mechanism of the type required in the prior art systems is needed, and no excessive freedom of the bearing components such as in the conventional tilting pad exists since the shoes are integrally formed with the common base through the respective ribs. Thus, the structure of the device is comparatively simple.

Further details of the invention will be explained following the brief description of the drawings given below.

BRIEF DESCRIPTION OF THE DRAWINGS

FIGS. 2(a) to 2(e) show, in combination, a first embodiment of the thrust bearing device according to the present invention, in which.

FIGS. 3(a) and 3(b) illustrate the performance of the first embodiment of the thrust bearing device, in which.

FIGS. 4(a) to 4(e) show, in combination, a second embodiment of the thrust bearing device according to the present invention, in which.

FIGS. 5(a) and 5(b) illustrate the performance of the second embodiment of the thrust bearing device, in which.

DETAILED DESCRIPTION OF THE PREFERRED EMBODIMENTS

One preferred embodiment of the present invention will be explained below with reference to the drawings.

Figure 2A:
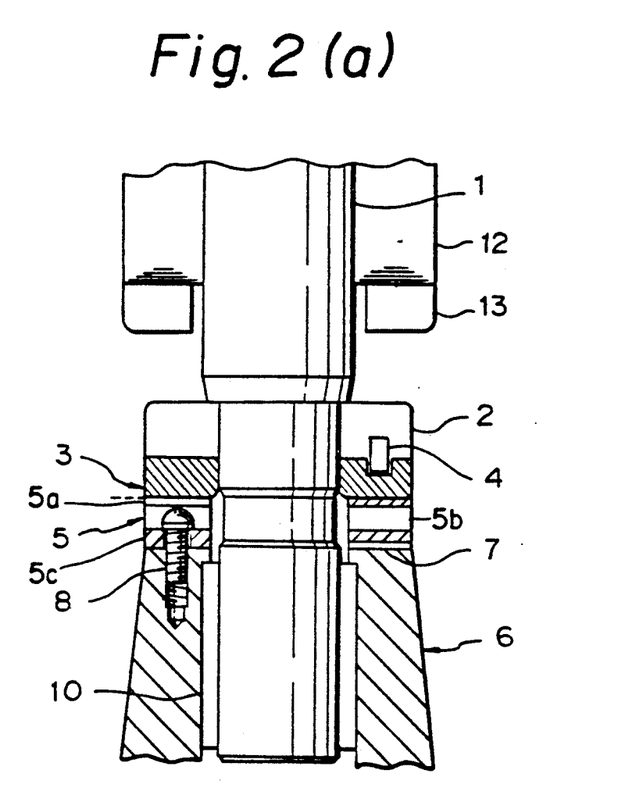
FIG. 2(a) shows a crosssection of the thrust bearing portion of the device taken in the direction of arrows 2(a)—2(a) of FIG. 2(b).
Figures 2B, 2C:
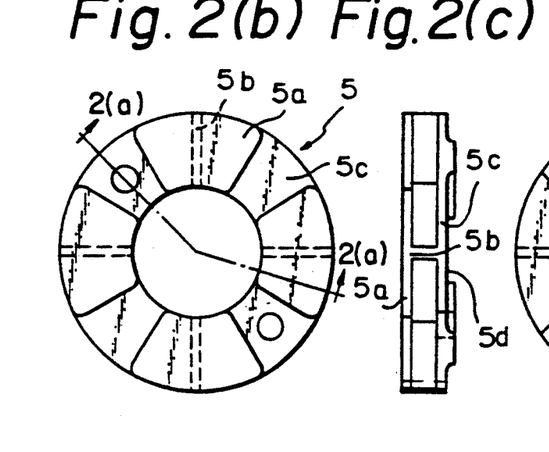
FIG. 2(b) is a plan view of the sliding shoe member.
FIG. 2(c) is a side view of the sliding shoe member.
Figure 2D:
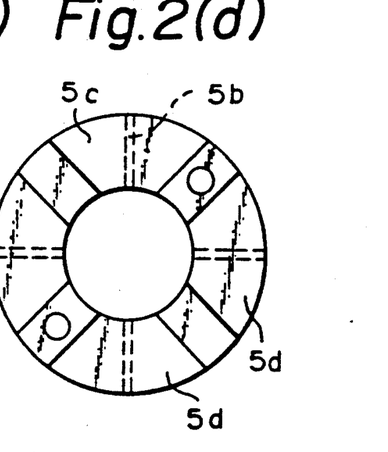
FIG. 2(d) is a bottom view of the sliding shoe member.
Figure 2E:
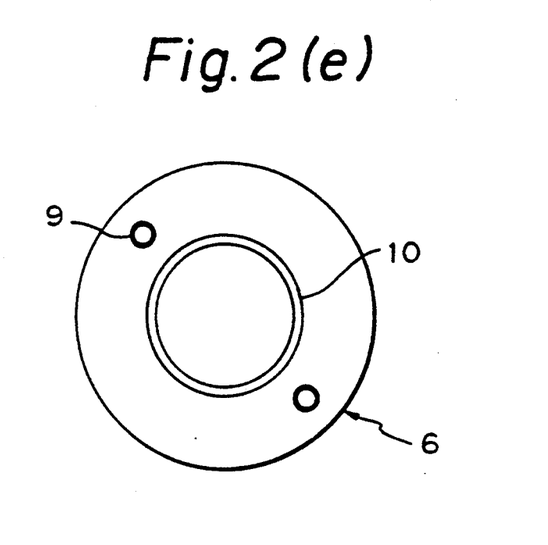
FIG. 2(e) is a plan view of the retaining surface of the motor bracket.

FIGS. 2(a) to 2(e) show, in combination, a first embodiment of the thrust bearing device according to the present invention, in which: FIG. 2(a) shows a crosssection of the thrust bearing portion of the device; FIG. 2(b) is a plan view of the sliding shoe member; FIG. 2(c) is a side view of the sliding shoe member; FIG. 2(d) is a bottom view of the sliding shoe member; and FIG. 2(e) is a plan view of the retaining surface of the motor bracket. In the figures, reference numeral 1 denotes a primary shaft of an electric motor. A metallic thrust disk 2 is secured to the lower portion of the primary shaft 1 by shrink fitting the metallic disk 2 thereto. On the lower surface of the thrust disk 2 is disposed a rotary disk 3 which is engaged with the disk 2 by a pin 4. Thus, a rotary disk 3 is indirectly fixed on the primary shaft 1 through the thrust disk 2. Alternatively, the rotor disk 3 could be directly fixed on the primary shaft 1. The disk 3 is made of a material primarily comprising carbon impregnated with plastics or Babbitt metal.

Reference numeral 5 denotes a sliding shoe member having sliding surfaces slidably in contact with the sliding surface, that is, the lower end surface of the rotary disk 3. The member 5 is made of metal and is provided with a plurality of sliding shoes 5a as shown in FIGS. 2(b) and 2(c). Each shoe 5a has a sliding surface that forms a segment of a common coplanar surface and is supported on a common base 5c through a rib 5b. The shoe member 5 is fixed on a motor bracket 6 by means of a screw 8 with a gap 7 provided between the retaining surface of the bracket 6 and the bottom surface of the sliding shoe member 5 at each of the portions thereof which respectively correspond to the shoes 5a. The gaps 7 are formed by providing a plurality of recesses 5d on the bottom surface of the base 5c which are circumferentially spaced from each other as shown in FIGS. 2(c) and 2(d). The gaps 7 have a substantially uniform length in the circumferential direction and each has a uniform depth. The lower end of the shaft 1 is rotatably supported by a radial bearing 10. Reference numeral 12 denotes a rotor, and 13 a secondary conductor.

Figure 3A:
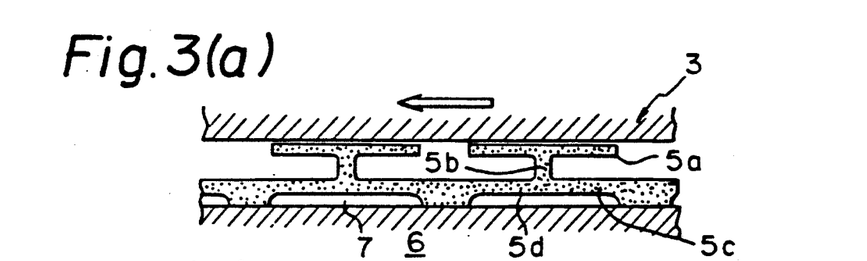
FIG. 3(a) schematically shows a state wherein no load is applied on the thrust bearing device.
Figure 3B:
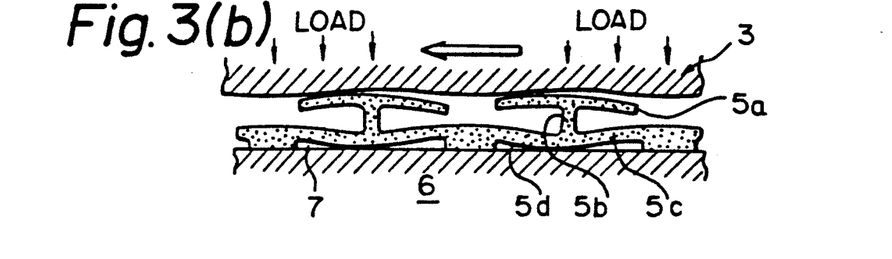
FIG. 3(b) shows a state wherein load is applied on the device.

FIGS. 3(a) and 3(b) illustrate the performance of the above-described bearing device, in which: FIG. 3(a) schematically shows a state wherein no load is applied on the thrust bearing device; and FIG. 3(b) shows a state wherein load is applied on the device. As shown in FIG. 3(a), when no load is applied on the shoe member 5 in the thrust direction, the shoe 5a is not deformed. However, when load is applied in the thrust direction as shown in FIG. 3(b), the shoe 5a is elastically deformed downwardly in proportion to the applied load assuming is rib 5b to be the center of deformation, and a liquid film having a wedge shape is formed between the rotary disk 3 and the shoes 5a. Hence, a high load bearing capacity can be expected of this device as in the case of a conventional thrust bearing device employing a tilting pad system. In addition, when load is applied, the common base 5c of the sliding shoe member 5 is deformed by virtue of the presence of the gap 7 between the member 5 and the motor bracket 6, thereby absorbing the deflection caused by the inevitable manufacturing tolerances on the sliding surface of the disk 3 and the top surface of the bracket 6, and thus preventing local contact of the sliding surfaces of the shoes 5a and enabling the sliding mode of the shoes 5a to be kept uniform.

Although it is apparent that the configuration of the sliding shoe member 5 may be complex, it can be easily manufactured by precise casting using a lost-wax process or the like. Further, although the sliding surfaces of the shoe member 5 are defined by spaced segmented shoes 5a, they can be machined at one time in a common plane (with lapping finish) and, therefore, a complicated alignment mechanism as has been required in the prior art is not needed. Also, since the shoes 5a are made integral with the base 5c through the respective ribs 5c, there is no excessive freedom of the bearing components as in the case of tilting pads and, therefore, no means for retaining the bearing components is required.

It is impossible to avoid the deflection caused by the inevitable manufacturing tolerances on the flat sliding surface of the rotor disk 3 or the flat top surface of the motor bracket 6 on which the sliding shoe member 5 is mounted. Thus, is the shoe member 5 is directly mounted on the motor bracket 6, local contact of the sliding surfaces of the shoes 5a could very easily occur. By providing a gap between the retaining surface of the motor bracket 6 and the bottom surface of the common base 5c of the sliding shoe member 5 at each of the portions thereof which respectively correspond to the shoes 5a, local contact of the shoes 5a can be avoided and thus the sliding mode of the shoes 5a is kept uniform, as stated above.

According to the design of the thrust bearing device, in the manner described above, the structure of the device is relatively simple and the cost thereof can accordingly be low. Also, even though the configuration of the shoe member 5 may be complicated as the shoes 5a are connected to the base 5c in one unit through the ribs 5b, the shoe member 5 can be easily manufactured by using a lost-wax casting process or the like, as stated above.

Figures 4A, 4B, 4C:
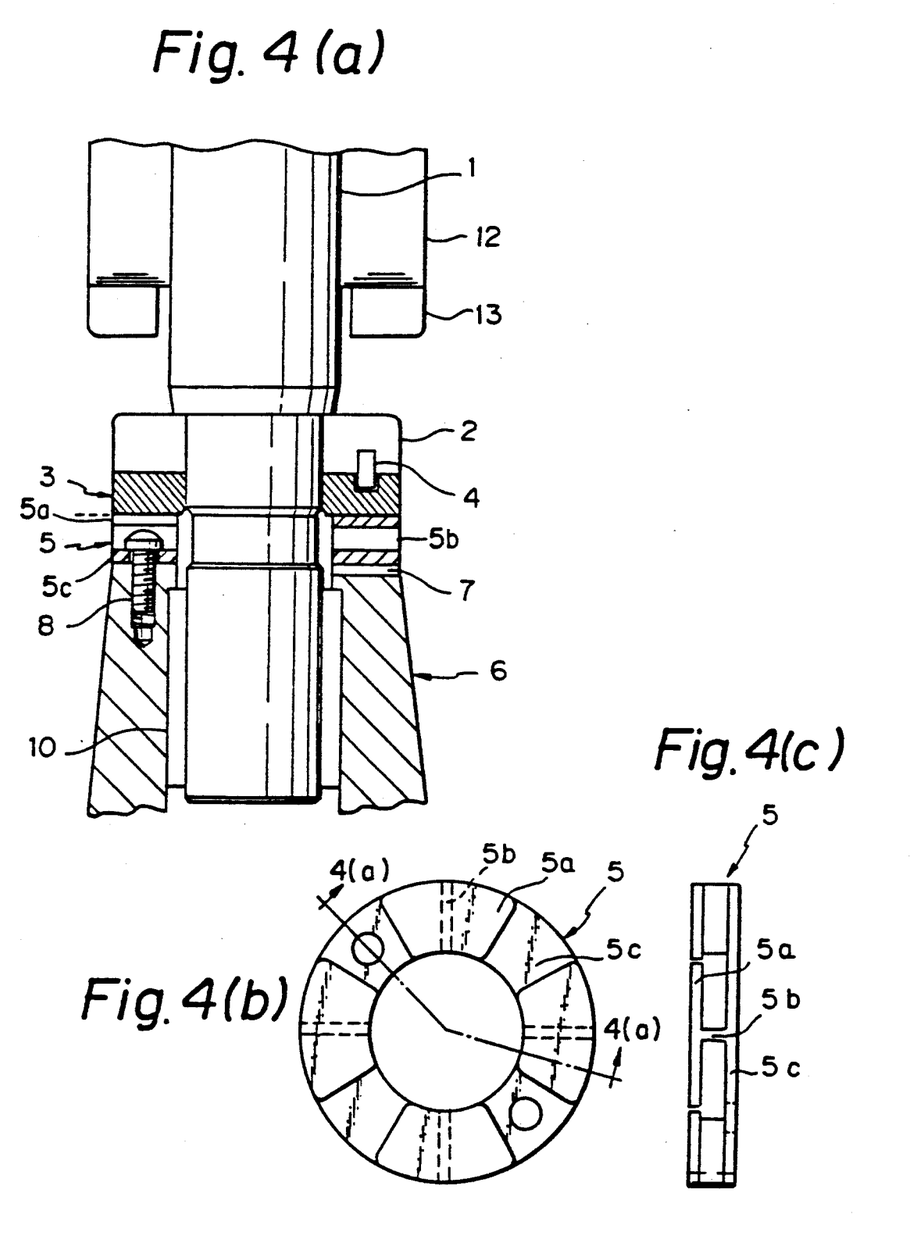
FIG. 4(a) shows a crosssection of the thrust bearing portion of the device taken in the direction of arrows 4(a)—4(a) of FIB. 4(b)
FIG. 4(b) is a plan view of the sliding shoe member.
FIG. 4(c) is a side view of the sliding shoe member.
Figures 4D, 4E:
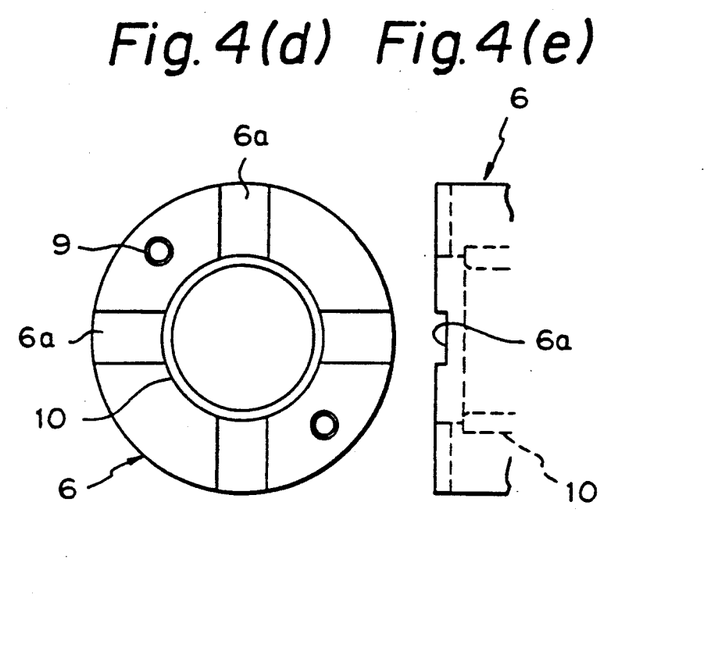
FIG. 4(d) is a plan view of the retaining surface of the motor bracket.
FIG. 4(e) is a side view of the retaining portion of the motor bracket.

FIGS. 4(a) to 4(e) show, in combination, a second embodiment of the thrust bearing device according to the present invention, in which: FIG. 4(a) shows a crossection of the thrust bearing portion of the device; FIG. 4(b) is a plan view of the sliding shoe member; FIG. 4(c) is a side view of the sliding shoe member; FIG. 4(d) is a plan view of the retaining surface of the motor bracket; and FIG. 4(e) is a side view of the retaining portion of the motor bracket. As is clear from the figures, in this embodiment, the bottom surface of the common base 5c of the sliding shoe member 5 is flat and a plurality of recesses 6a are formed in the retaining surface of the bracket 6 and are circumferentially spaced from each other. Thus, a gap 7 is defined by each recess 6a between the bracket 6 and the bottom surface of the common base 5c at each of the portions thereof which respectively correspond to the shoes 5a.

Figure 5A:
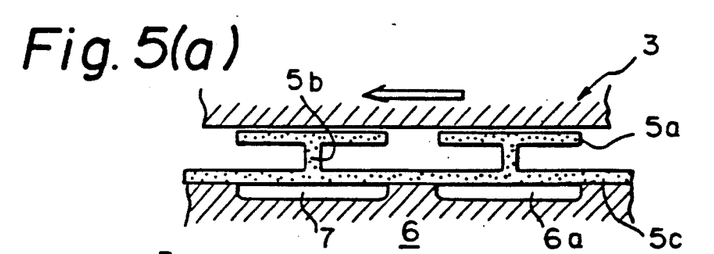
FIG. 5(a) schematically shows a state wherein no load is applied on the thrust bearing device.
Figure 5B:
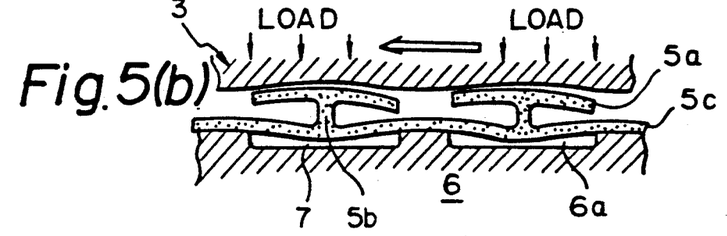
FIG. 5(b) shows a state wherein load is applied on the device.

FIGS. 5(a) and 5(b) illustrate the performance of the above-described bearing device, in which: FIG. 5(a) schematically shows a state wherein no load is applied on the thrust bearing device; and FIG. 5(b) shows a state wherein load is applied on the device. As shown in FIG. 5(a), when no load is applied in the thrust direction on the shoe member 5, the shoe 5a is not deformed. However, when load is applied in the thrust direction as shown in FIG. 5(b), the shoe 5a is elastically deformed downwardly in proportion to the applied load assuming its rib 5b to be in center of deformation and a liquid film in a wedge shape is formed between the rotary disk 3 and the shoes 5a. Hence, a high load bearing capacity can be expected of this device as in the case of a conventional thrust bearing device employing a tilting pad system. In addition, when load is applied, the common base 5c of the sliding shoe member 5 is deformed by virtue of the presence of the gap 7 between the bottom surface of the member 5 the motor bracket 6, thereby absorbing the deflection caused by the inevitable manufacturing tolerances on the sliding surface of the disk 3 and the top surface of the bracket 6, and thus preventing local contact of the sliding surfaces of the shoes 5a and enabling the sliding mode of the shoes 5a to be kept uniform.

As has been described above, it is possible according to the present invention to obtain the following advantageous effects.

(a) When load is applied, the shoes of the sliding shoe member are elastically deformed and a liquid film having a wedge shape is formed between the rotary disk and the shoes. Thus, a high load bearing capacity can be expected of this device as in the case of a conventional thrust bearing device employing a tilting pad system. In addition, when load is applied, the common base of the sliding shoe member is also deformed by virtue of the presence of the gap between the shoe member and the motor bracket, thereby absorbing the deflection caused by the manufacturing tolerances on the sliding surface of the rotary disk and the top surface of the bracket. Thus, local contact of the sliding surfaces of the shoes can be prevented and the sliding mode of the shoes can be kept uniform.

(b) Since no complicated alignment mechanism of the type required on the stationary side in a conventional thrust bearing device is needed, cost savings can be expected to the extent of making it possible for production costs to be as low as 166 to 1/5 of the cost of making the stationary side of a conventional device.

(c) Maintenance of the device is facilitated because either the shoe member or the rotary disk has segmented shoes, which are connected to a base through respective ribs, and the sliding surfaces of these shoes are formed by simply machining said surfaces to be flat. Thus no machining of complex surfaces such as the centrally projected or inflated configuration required in the tilting pad system is necessary.

(d) The provision of excessive freedom for bearing components is unnecessary and therefore assembly of the thrust bearing device is facilitated.

(e) Since a bearing can be fixed on a motor bracket, assembly of the motor is facilitated.

What is claimed is:

1. A thrust bearing device of an electric motor lubricated by liquid within a casing, comprising:

a rotary disk fixed on a primary shaft of said motor, said rotary disk defining a sliding surface thereon; and a metal one-piece unitary sliding shoe member comprising an annular base having a bottom surface, a plurality of ribs extending from said base, and a plurality of segmental shoes spaced from each other in a circumferential direction of said base and extending directly from said ribs so as to be supported over said base by said ribs, said ribs spacing said segmental shoes apart from one another in said circumferential direction above said base, said segmental shoes defining sliding surfaces thereon in sliding contact with the sliding surface of said rotary disk, and said unitary sliding shoes member fixed to a bracket of the motor so as to be disposed on a retaining surface of the bracket, said device defining gaps between said retaining surface and the bottom surface of said base at respective locations corresponding to the positions at which said shoes are supported over said base by said ribs to prevent local contact of the sliding surfaces of said segmental shoes owing to manufacturing tolerances of the sliding surface of the rotary disk and the retaining surface of the bracket.

2. A thrust bearing device as claimed in claim 1 wherein said rotary disk is directly fixed to said primary sheet.

3. A thrust bearing device as claimed in any one of claims 1 and 2, wherein said rotary disk is made of carbon impregnated with plastics or Babbitt Metal.

4. A thrust bearing device as claimed in claim 1 wherein said device further includes a thrust disk fixed to said primary shaft and said rotary disk is fixed to a lower surface of said thrust disk, whereby said rotary disk is indirectly fixed to said primary shaft through said thrust disk.

5. A thrust bearing device as claimed in claim 1 wherein said gaps have a substantially uniform length in the circumferential direction of said base and each has a uniform depth.

6. A thrust bearing device as claimed in claim 1 wherein said gaps are a plurality of recesses defined in the bottom surface of said base and are circumferentially spaced from each other.

7. A thrust bearing device as claimed in claim 1 wherein said gaps are a plurality of recesses defined in the retaining surface of said motor bracket and are circumferentially spaced from each other.

8. A thrust bearing device as claimed in claim 1, wherein said sliding shoe member defines a plurality of holes extending through the base thereof at respective locations defined directly below spaces between said segmental shoes in said circumferential direction, and further comprising fastening means extending through said holes for fixing said sliding shoe member to the bracket of the motor.

* * * * *